United States Patent [19]

Fredin et al.

[11] 4,400,347

[45] Aug. 23, 1983

[54] ABSORBER MEMBER FOR MOUNTING IN THE LATTICE OF A BOILING WATER REACTOR

[75] Inventors: Bo Fredin; Olov Nylund, both of Västerås, Sweden

[73] Assignee: AB Asea Atom, Västerås, Sweden

[21] Appl. No.: 258,821

[22] Filed: Apr. 29, 1981

[30] Foreign Application Priority Data

Jun. 13, 1980 [SE] Sweden ................................ 8004411

[51] Int. Cl.³ .............................................. G21C 7/10
[52] U.S. Cl. ..................................... 376/333; 376/327; 376/432
[58] Field of Search .............. 376/333, 334, 327, 419, 376/428, 447, 455, 432

[56] References Cited

U.S. PATENT DOCUMENTS

| | | | |
|---|---|---|---|
| 2,861,035 | 11/1958 | Zinn et al. | 376/334 |
| 3,103,479 | 9/1963 | Ransohoff | 376/447 |
| 3,141,227 | 7/1964 | Klepfer et al. | 376/327 |
| 3,194,743 | 7/1965 | Deddens et al. | 376/327 |
| 3,712,852 | 1/1973 | Fisher | 376/327 |

FOREIGN PATENT DOCUMENTS

974129 11/1964 United Kingdom ................ 376/333

Primary Examiner—Harvey E. Behrend
Attorney, Agent, or Firm—Pollock, Vande Sande & Priddy

[57] ABSTRACT

An elongated absorber plate, which is stationarily mounted in a gap between two fuel assemblies in a reactor core, comprises a plurality of absorber channels which are filled with a burnable absorber material. The channels (5b) are formed by welding to each other two confronting sheet elements (2b, 3b), of which at least one is corrugated.

4 Claims, 12 Drawing Figures a-a b-b c-c d-d

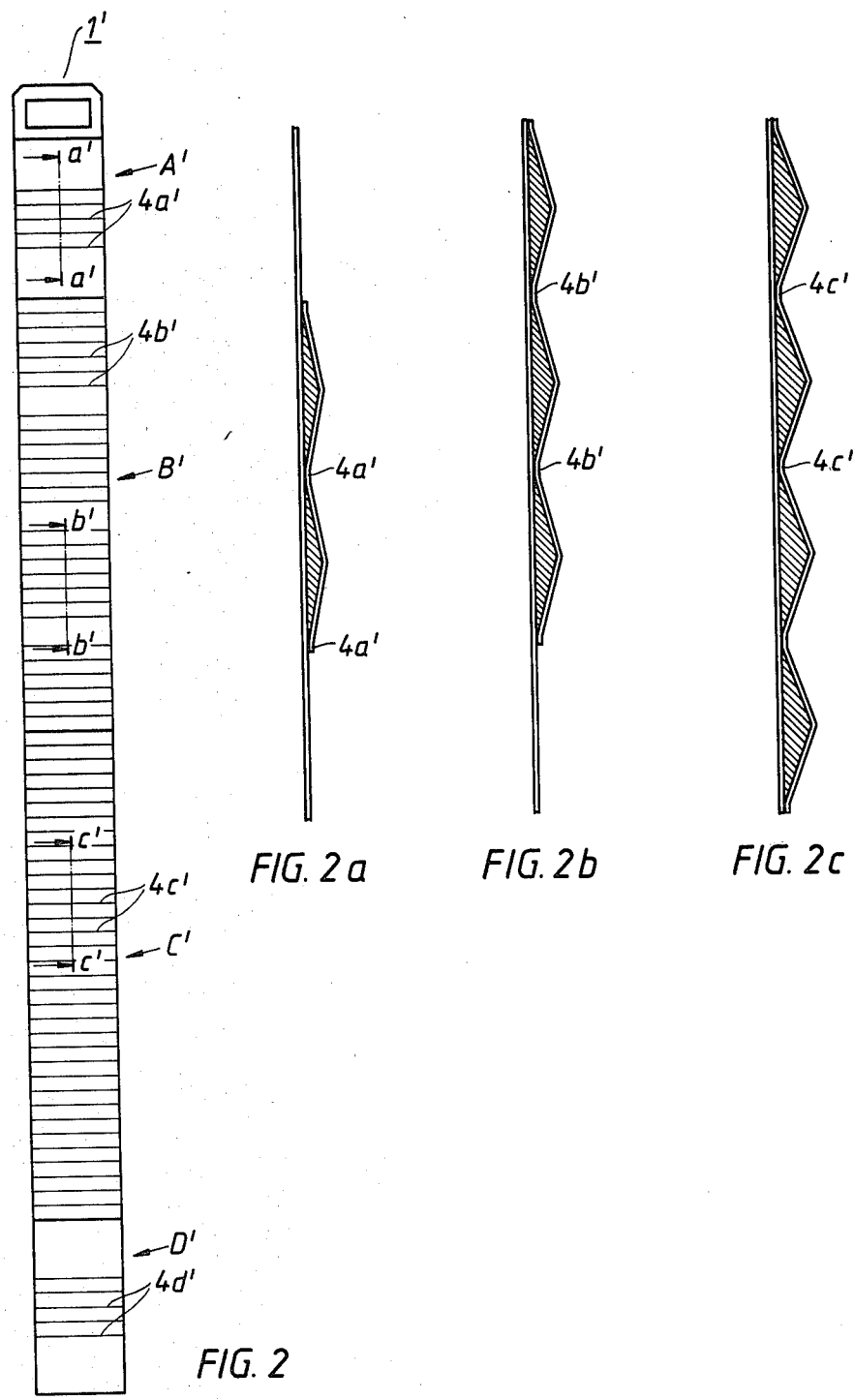

ABSORBER MEMBER FOR MOUNTING IN THE LATTICE OF A BOILING WATER REACTOR

The present invention relates to an absorber member arranged in a boiling water reactor (BWR) in a gap between two bundles of vertical fuel rods and comprising at least one absorber plate which contains burnable absorber material.

It is known to make such absorber members in the form of an elongated homogeneous plate which is made of boron steel and formed with a constant, rectangular cross-section along a major part of its length.

In comparison with the known member, an absorber member according to the invention aims at achieving a greater amount of burnable absorber material in relation to carrier material and at achieving as low a final absorption as possible. Further, the intention is to achieve an absorber member comprising one single or a plurality of absorption plates arranged vertically one after the other, which are formed in such a manner that the absorption capacity of each plate falls relatively evenly as a function of the time of operation. Further, the invention relates to an absorber member which, when being arranged in a gap between two fuel boxes, shall be able to have a relatively great thickness along a predominant part of its length, for example corresponding to a maximum burnup time of at least half a year, and at the same time permit a sufficient passage of water in the corresponding portion of the gap.

In the following the invention will be described with reference to the accompanying schematic drawings.

FIGS. 1 and 2 show a horizontal view of a first and a second embodiment of an absorber member according to the invention.

Figure 1:
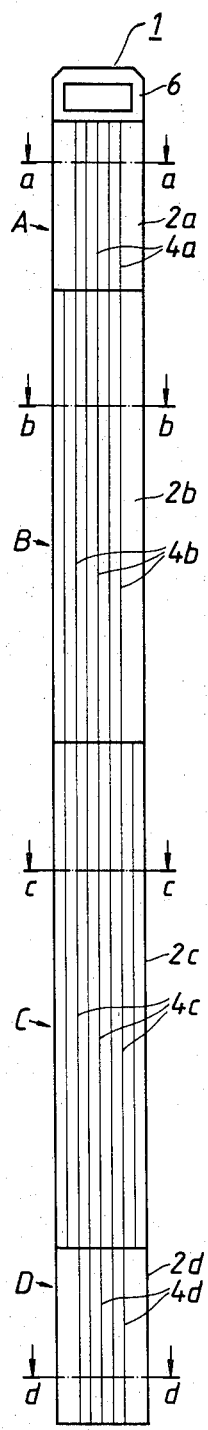
Figure 1A:
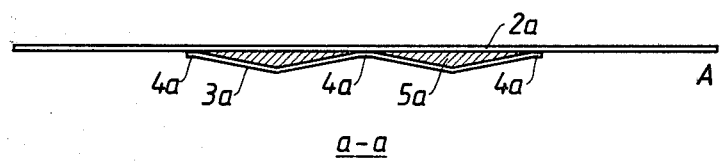
FIGS. 1a, 1b, 1c and 1d show sections along a—a, b—b, c—c and d—d of FIG. 1, that is, through each of the four absorber plates, A, B, C, D, which are connected to each other and together form an absorber member.
Figure 1B:
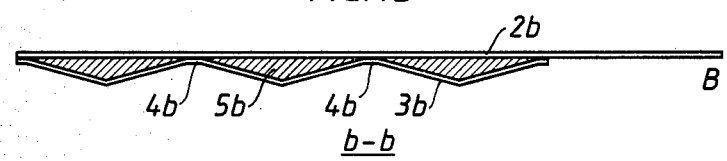
Figure 1C:
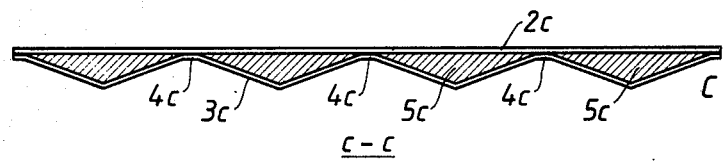
Figure 1D:
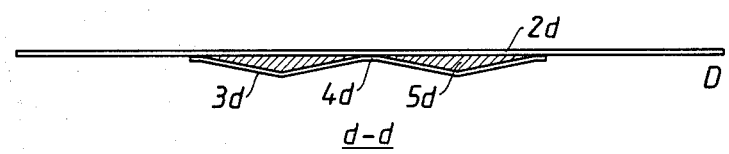

The absorber member 1 shown in FIG. 1 is composed of four mutually interconnected absorber plates A, B, C, D, arranged vertically one after the other. Each of the absorber plates A, B, C, D contains a plane sheet element 2a, 2b, 2c, 2d, respectively, and a wavy sheet element, 3a, 3b, 3c, 3d, respectively, a plurality of wave ridges 4a, 4b, 4c, 4d, respectively, facing the plane sheet element, being welded to said wavy sheet element. A plurality of absorber channels 5a, 5b, 5c, 5d, respectively of triangular cross-section are then formed between the two sheet elements. Each of said absorber channels is filled with a burnable absorber material, for example gadolinium oxide. In all embodiments, the sheet elements of the absorber plates are preferably made of a zirconium alloy intended for reactor components, that is, an alloy with low neutron absorption. The thickness of the sheet is less than 1.0 mm, preferably less than 0.7 mm. Absorber member 1 is provided with a lifting eye 6. Absorber plate A has substantially the same vertical dimension as absorber plate D. This dimension is smaller than 50% of the vertical dimension of absorber plate C, which is at most 30% longer than absorber plate B. The maximum absorption capacity per $cm^2$ of the plate surface is varied by varying the portion of the plate width occupied by absorption channels (100% in C, 75% in B, 50% in A and D). Varying burnup times have been obtained by making the absorption channels with varying channel heights. The channel height is smallest in plates A and D, larger in plates B and largest in plate C.

The absorber member shown in FIG. 2 differs from that described above in that the wave ridges 4a', 4b', 4c', 4d' of the absorber plates A', B', C', D' are running horizontally instead of vertically.

Figure 5:
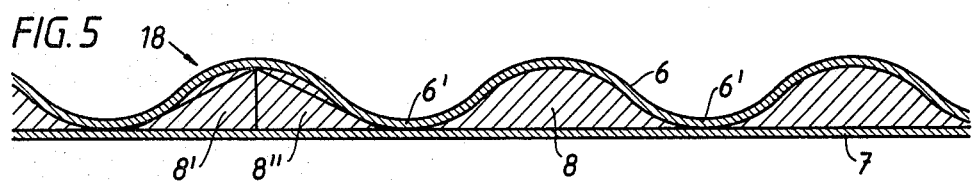
FIGS. 5 and 6 show a third and a fourth embodiment of an absorber member according to the invention in cross-section through the channels filled with absorber material.
Figure 6:
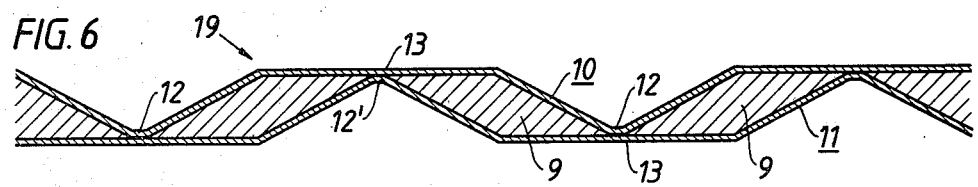

Absorption members of a design similar to those shown in FIGS. 1 and 2, may also be provided with absorber plates constructed according to FIGS. 5 and 6. The absorber plate 18 shown in FIG. 5 differs from those shown in FIGS. 1 and 2 in that its waved sheet element 6 substantially follows a sinusoidal curve. A plurality of absorber channels 8 are formed between the sheet element 6 and a plane sheet element 7.

In the absorber plate 19 shown in FIG. 6, a plurality of absorber channels 9 are formed with the aid of two waved sheet elements, 10 and 11. The sheet elements 10 and 11 have a plurality of parallelly running wave ridges 12 and 12', respectively, and intermediate, substantially plane sheet portions 13 which are positioned in one and the same plane. The wave ridges 12 of the sheet element 10 are welded to the plane sheet portions 13 of the sheet element 11, and vice versa.

Figure 3:
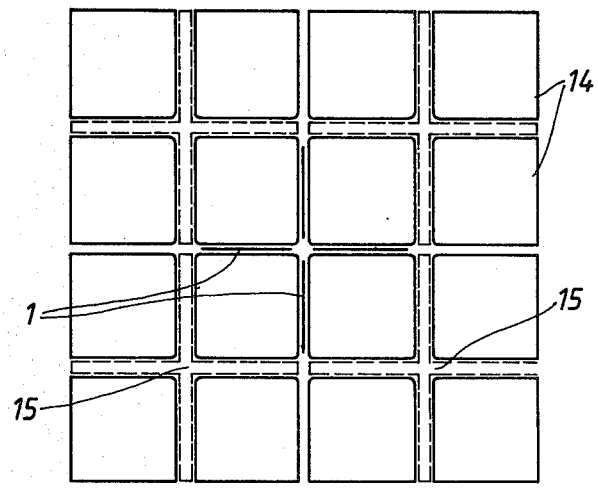
FIGS. 3 and 4 show partial horizontal sections of two different reactor cores, in which a plurality of absorber members according to the invention are arranged.

FIG. 3 shows part of a reactor core of a conventional design in which a plurality of absorber members 1 are arranged. The core contains a plurality of fuel rod bundles, which are each included in a fuel assembly 14. The fuel assemblies 14 are separated from each other by means of intermediate gaps. Some of the gaps are relatively wide and are intended for control rods 15. A plurality of the other gaps are each provided with an absorber member 1.

Figure 4:
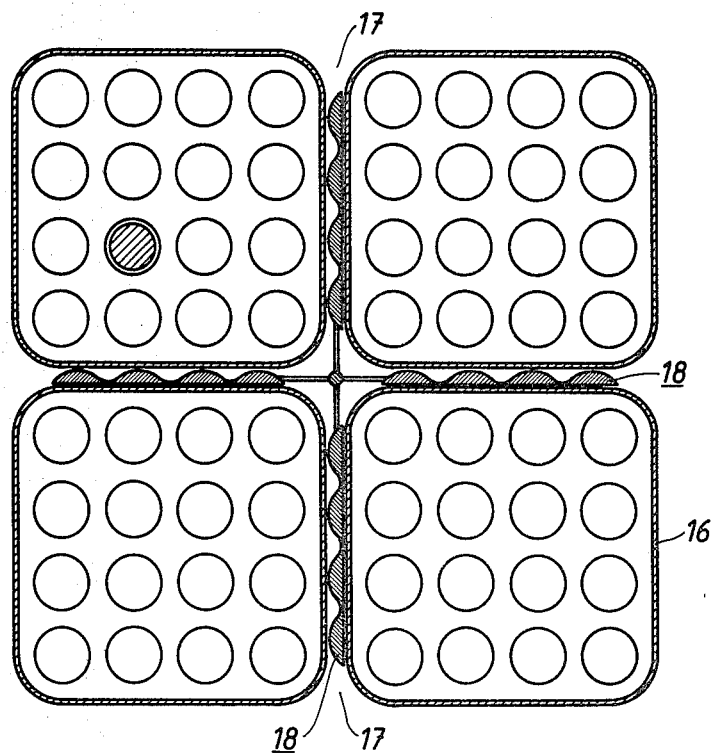

FIG. 4 shows a cross-section through a four-part fuel assembly which is composed of four partial assemblies 16 which are provided with a common bottom portion (not shown). The four-part fuel assembly is made with the same external dimensions as the fuel assembly 14, shown in FIG. 3, and may replace this. Gaps 17 are provided between the partial assemblies 16 of the fuel assembly and are each furnished with an absorber member according to the invention, the maximum thickness of said absorber member then constituting at least 75% of the width of the gap. The absorber members are each attached to the upper end of a corresponding partial assembly and may, when the burnable absorber material is consumed, be removed without the fuel assemblies of their partial assemblies being lifted out of the core.

An absorber member according to the invention is particularly well adapted to be positioned in the relatively narrow gaps between the partial assemblies in a four-part fuel assembly. Even when adapted to a small gap width, the absorber member can be constructed with such a large maximum thickness of the absorber bodies located in the channels that the time for complete burnup of the absorber material is sufficiently long, for example more than ¾ year. This is partly due to the fact that the sheet elements can be made very thin, for example with a thickness of less than 0.5 mm, partly to the fact that the corrugation of each absorber plate results in wave troughs therein which, even if the intermediate sheet portions provide a total bridging of the gap, prevent hydraulic blocking. Instead of the absorber member shown in FIG. 4, which is shown in detail in FIG. 5, of course any of the other embodiments shown in the drawings may be used. The embodiment shown in FIG. 6 is particularly advantageous, since the plane sheet portions 13 involve a reduced risk of wearing upon contact with adjacent fuel assemblies. In addition, these portions give a hydraulic damping which counteracts vibrations.

On examining the channel cross-section of the above-described fuel channels, it will be seen that in FIGS. 1, 2 and 6 said cross-section may be divided into two adjacently positioned right-angled triangles, a small side in each triangle lying in plane with plane limiting surfaces of a plurality of absorber channels. In the embodiment indicated in FIG. 7, the channel cross-section consists of one single such triangle. In the channel cross-section shown in FIG. 5, two such triangles 8' and 8" may be drawn in such a way that these cover at least 70% of the channel cross-section.

If an ideal, black absorber is assumed, each of the above-mentioned triangular cross-sectional portions gives a linear burnup cycle. This is readily realized by considering FIG. 7 and FIG. 8. On FIG. 7, the hypotenuse in the shown triangle constitutes a curve which depicts the amount of burnable absorber material per $cm^2$ of absorber plate as a function of the distance b from one longitudinal edge of the triangular channel. It is shown how the channel cross-section may possibly be divided into a plurality of equally wide portions a, b, c, d, e, f, g, h, i, j. The contents of burnable absorber material in portion a is designated $\frac{1}{2}\Delta N$, the corresponding contents in portion b being equal to $1.5\Delta N$, in portion c equal to $2.5\Delta N$, and so on. Then, if we designate the average burnup time for the portion a as $\Delta t$, the average burnup time for portion b is equal to $3\Delta t$, for portion c equal to $5\Delta t$, and so on.

Figure 7:
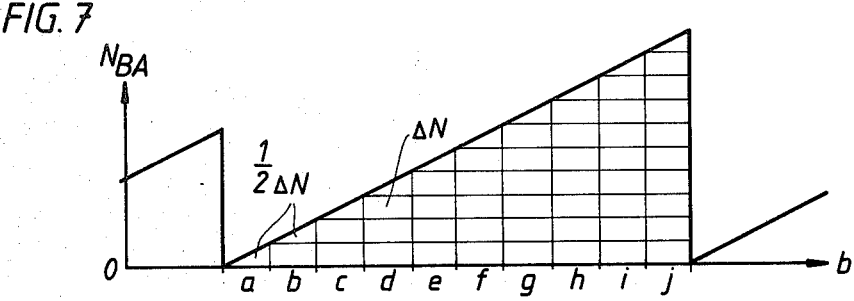
FIG. 7 shows the number of absorbing cores per $cm^2$ in different portions of an absorber channel of triangular cross-section.
Figure 8:
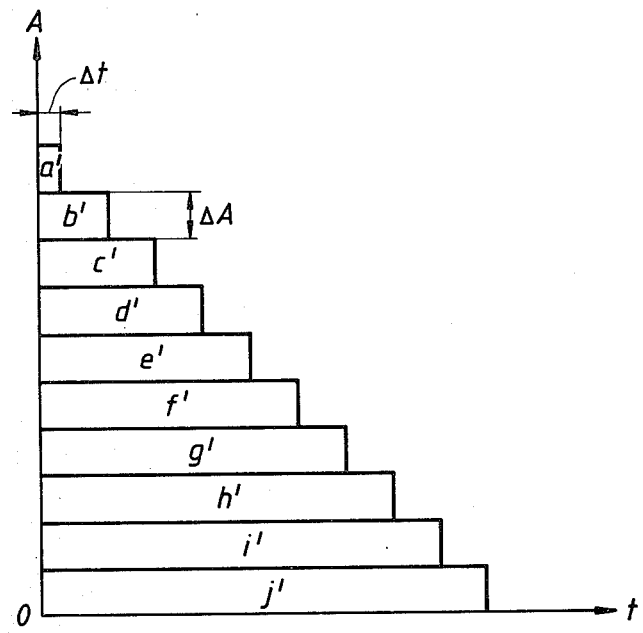
FIG. 8 shows the absorption capacity of such a channel as a function of time.

Since the neutron absorption per $cm^2$ of an absorber plate is substantially independent of the thickness of the plate, the absorption of the portions a, b, c, and so on, has one and the same value, which is designated $\Delta A$ in FIG. 8. The absorption capacity of each of the portions a, b, c and so on is represented as a rectangle with a vertical side of the length $\Delta A$ and a horizontal side the length of which corresponds to the average burnup time. By drawing such rectangles, a', b', c' and so on for all portions a, b, c and so on and placing them on top of each other in a system of coordinates where the ordinate axis relates to the absorption, A, and the abscissa to the time, t, the stepped curve shown in FIG. 8 is obtained, which curve approaches a straight line when portions a, b, c and so on in FIG. 7 are selected with a sufficiently small width.

In practice, the absorber material cannot be considered to constitute an ideal black absorber, and therefore, also in case of a channel cross-section according to FIG. 7, a burnup cycle is obtained which is not quite linear. However, the absorber channels are still selected with such a shape that the cross-sectional area of each channel is covered at least to 70% by one or more inscribed right-angled triangles, a small side in each triangle then lying on a straight line which touches substantially plane portions of a plurality of absorber channels positioned adjacent to each other. Even if this condition is not fulfilled, the wavy structure of an absorber member according to the invention results in a burnup cycle which is relatively even and which is considerably nearer the linearity than the burnup cycle of an absorber plate of rectangular cross-section, for example the known absorber plate mentioned at the beginning of this description.

In all embodiments of the invention, the absorber channels in an absorber plate are sealed at the ends, unless the ends are connected to corresponding channels of adjacent absorber plates.

We claim:

1. An absorber member stationarily arranged in a boiling water reactor in a gap between two bundles of vertical fuel rods, comprising at least one absorber plate which contains burnable absorber material, each of the two side surfaces of said absorber plate facing a corresponding bundle of fuel rods, said absorber plate (B; 18; 19) containing a first (3b; 6; 10) and a second (2b; 7; 11) sheet element, arranged adjacent to each other, each providing one of said side surfaces, at least said first sheet element having a corrugated shape with a plurality of mutually parallel wave ridges (4b; 6'; 12), said first and second sheet elements being connected to each other by means of a plurality of welded joints arranged on said wave ridges, a plurality of channels (5b; 8; 9) being defined between said first sheet element and said second sheet element, said channels being filled with said burnable absorber material.

2. An absorber member as claimed in claim 1, wherein said second sheet element has a corrugated shape with a plurality of ridges (12') which are parallel to the ridges (12) of said first sheet element and, similar to these, mutually connected by means of a plurality of intermediate, substantially plane sheet portions (13) lying in one and the same plane, said sheet portions of said second sheet element being each welded to a ridge of said first sheet element and vice versa.

3. An absorber member as claimed in claim 1 or 2, wherein the channel cross-section of each of said channels has such a shape that the cross-sectional area of the channel can be covered to at least 70% by one or more inscribed right-angled triangles (8'; 8"), a small side in each triangle lying substantially in the same plane as a plurality of substantially plane surface portions belonging to a plurality of mutually adjacent absorber channels (8).

4. An absorber member as claimed in claim 1, wherein said sheet elements are made of a zirconium alloy intended for nuclear reactors.

* * * * *